US005634031A

United States Patent [19]

Sakuma

[11] Patent Number: 5,634,031
[45] Date of Patent: May 27, 1997

[54] OPTICAL DISK SYSTEM HAVING TABLE-OF-CONTENTS INFORMATION DATA

[76] Inventor: Hiroto Sakuma, 19, Aza-shinokara, Ooaza-kaminodejima, Higashimura, Nishishirakawa-gun, Fukushima, 961-03, Japan

[21] Appl. No.: 391,550

[22] Filed: Feb. 21, 1995

[30] Foreign Application Priority Data

Mar. 4, 1994 [JP] Japan .................................. 6-60043

[51] Int. Cl.$^6$ ................................................ G06F 13/00
[52] U.S. Cl. ................... 395/438; 395/427; 395/439; 369/47; 369/48; 364/DIG. 1
[58] Field of Search .......................... 395/427, 438, 395/439; 369/47, 48, 54, 58

[56] References Cited

U.S. PATENT DOCUMENTS

| | | | |
|---|---|---|---|
| 5,065,388 | 11/1991 | Roth et al. | 369/47 |
| 5,124,966 | 6/1992 | Roth et al. | 369/47 |
| 5,257,254 | 10/1993 | Kutaragi | 369/50 |
| 5,317,549 | 5/1994 | Maeda et al. | 369/32 |
| 5,324,883 | 6/1994 | Kondo | 84/615 |
| 5,406,538 | 4/1995 | Hotori et al. | 369/48 |
| 5,422,871 | 6/1995 | Nakashima et al. | 369/47 |
| 5,475,668 | 12/1995 | Azumatani et al. | 369/58 |

FOREIGN PATENT DOCUMENTS

| | | |
|---|---|---|
| 3-100983 | 4/1991 | Japan . |
| 4-188467 | 7/1992 | Japan . |
| 6-295568 | 10/1994 | Japan . |
| 6-299569 | 10/1994 | Japan . |
| 6-299570 | 10/1994 | Japan . |
| 6-302156 | 10/1994 | Japan . |
| 7-21743 | 1/1995 | Japan . |

OTHER PUBLICATIONS

Operating Instructions for MZ-1 produced by Sony, p. 53 (English and Japanese versions).

Primary Examiner—Frank J. Asta
Attorney, Agent, or Firm—Dickstein Shapiro Morin & Oshinsky LLP

[57] ABSTRACT

To provide an optical disk recorder capable of reading data currently recorded even if the power supply is turned off during the recording of record data in a system using an optical disk in which table-of-contents information is not recorded in an area other than a user's recording area for recording record data and recording and reproducing of data is controlled according to the table-of-contents information. The optical disk recorder comprises an optical disk constituted so that table-of-contents information is written in an area other than a user's recording area for recording record data, a storage circuit constituted so that data can be read out of or written into the circuit by extending or compressing regenerated or recorded data in order to reproduce or record data from or into the optical disk, and a system controller for controlling reproducing and/or recording of data from and/or into the optical disk and storage circuit, and writes table-of-contents information in an area other than the user's recording area of the optical disk in accordance with a decided command for deciding the table-of-contents information given to the system controller, while recording record data in the user's recording area of the optical disk.

20 Claims, 10 Drawing Sheets

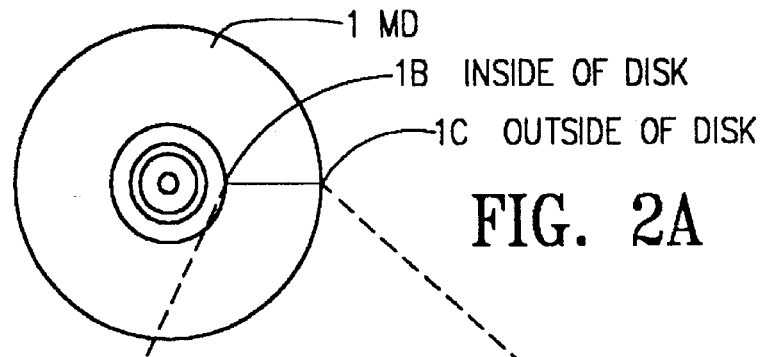
FIG. 2A
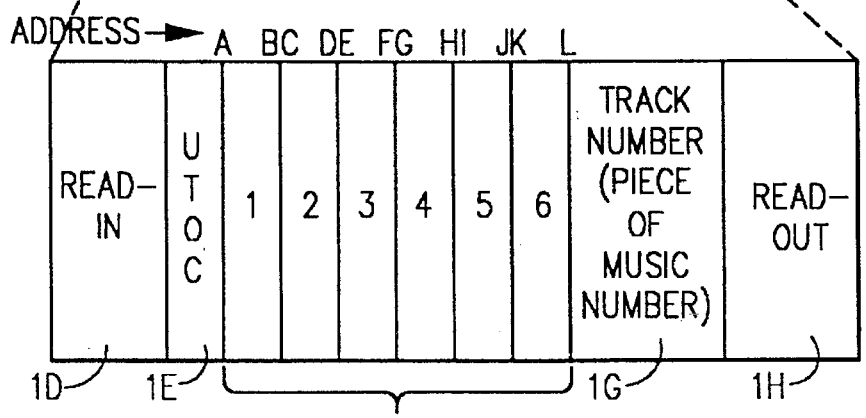
FIG. 2B
CONTENTS OF UTOC
| PIECE-OF-MUSIC NUMBER | ADDRESS |
|---|---|
| 1 | A B |
| 2 | C D |
| 3 | E F |
| 4 | G H |
| 5 | I J |
| 6 | K L |
FIG. 2C

① CONNECTION INFORMATION OF EACH BLOCK

| TRACK NUMBER | TRACK CONSTITUTING SEQUENCE 1 | TRACK CONSTITUTING SEQUENCE 2 | TRACK CONSTITUTING SEQUENCE 3 |
|---|---|---|---|
| 1 | SMALL BLOCK B1 | SMALL BLOCK B3 | |
| 2 | SMALL BLOCK B2 | | |
| 3 | SMALL BLOCK B5 | | |

31
32
33
34

② EMPTY BLOCK: SMALL BLOCK B4

35

③ START ADDRESS OF UNRECORDED AREA: ADDRESS K DOWNWARD

Fig. 4

① CONNECTION INFORMATION OF EACH BLOCK

| TRACK NUMBER | TRACK CONSTITUTING SEQUENCE 1 | TRACK CONSTITUTING SEQUENCE 2 | TRACK CONSTITUTING SEQUENCE 3 |
|---|---|---|---|
| 1 | SMALL BLOCK B1 | SMALL BLOCK B3 | |
| 2 | SMALL BLOCK B2 | | |
| 3 | SMALL BLOCK B5 | | |
| 4 | SMALL BLOCK B4 | SMALL BLOCK B6 | |
| 5 | SMALL BLOCK B7 | | |
| 6 | SMALL BLOCK B8 | | |

② EMPTY BLOCK: NONE

③ START ADDRESS OF UNRECORDED AREA: ADDRESS Q DOWNWARD

Fig. 6

CONTROL TABLE OF TABLE-OF-CONTENT INFORMATION

|  | START ADDRESS ON DISK | END ADDRESS ON DISK |
|---|---|---|
| (N)TH TRACK | (N) START | (N) END |
| (N+1)TH TRACK | (N+1) START | (N+1) END |
| ⋮ | ⋮ | ⋮ |

Fig. 9A

CONTROL TABLE OF STORAGE CIRCUIT ADDRESS CORRESPONDING TO TRACK

|  | START ADDRESS | END ADDRESS |
|---|---|---|
| (N)TH TRACK | (N)M-START | (N)M-END |
| (N+1)TH TRACK | (N+1)M-START | (N+1)M-END |
| ⋮ | ⋮ | ⋮ |

Fig. 9B

OPTICAL DISK SYSTEM HAVING TABLE-OF-CONTENTS INFORMATION DATA

BACKGROUND OF THE INVENTION

1. Field of the Invention

The present invention relates to a recording/reproducing system using an optical disk or a magneto-optical disk. In particular the invention relates to an optical disk system for recording information about start positions of plurality of block record data recorded in a user's recording area of a magneto-optical disk and information about linking and end positions of plurality of small-block record data constituting the block record data in an area other than the user's recording area of the magneto-optical disk.

2. Related Art

A compact disk (hereafter referred to as a CD) is hitherto known which is generally used as a medium for reproducing music signals. Recently, the research of a recording material of an optical disk medium has advanced, a recordable optical disk has been developed, and an apparatus for recording on a disk which has the same data format as the prerecorded CD has become practically usable. These recordable optical disks include a DRAW (Direct Read After Write)-type optical disks in which data can be recorded only once by deforming or vaporizing a recording material with the heat produced due to irradiation with a laser beam to form a recording pits. However, recorded data cannot be erased in this type of disk. These disks include an erasable-DRAW-type magneto-optical disk in which information can be repeatedly recorded and erased by using a laser beam as a light source and applying an external magnetic field to the magneto-optical disk from the side opposite to the light source to change the direction of perpendicular magnetization of a recording film. These magneto-optical disks are already practically used as an external memory unit of a computer.

Data in these magneto-optical disks is erased by applying a magnetic field reverse to that for recording to a recording film while irradiating a laser beam to the film and heating it. When the data in the magneto-optical disk is reproduced, a magneto-optical phenomenon called the Kerr effect is used to read the direction of magnetization. When applying a linearly-polarized laser beam to a perpendicular-magnetized film, the plane of polarization of reflected light slightly rotates counterclockwise or clockwise in accordance with the direction of magnetization. Information is reproduced by converting the rotation of the plane of polarization into a change of luminous energy using an analyzer.

As the method to record data in or erase data from the above magneto-optical disk, a light modulation method is used in which the data is recorded or erased by generating an N- or S-pole magnetic field at the side opposite to a laser beam centering around the magneto-optical disk and changing the laser power to a higher power by using a high-power laser when forming a mark and outputting a lower power similarly to a reproductive power when forming no mark to modulate the emitted laser power. In this case, the generated magnetic field supplementarily functions for recording. Also, in this case, it is impossible to overwrite the already recorded data.

However, though the operation theory is the same, an optical carrier recorder is being practically used in which a laser beam is emitted at a constant power from either side of a magneto-optical disk to record data by reversing the N and S poles of a magnetic field inversely to the case of the light modulation method. This is called the magnetic field modulation recording method in which already recorded data can be overwritten by modulating and recording a magnetic field. In the case of this method, it is possible to directly overwrite already recorded data without spending the time to erase the already recorded data and then recording new data.

For the above optical disk recorder conforming to the magneto-optical modulation recording method, a magneto-optical disk has recently been proposed which has the sampling frequency of 44.1 KHz and the resolution of 16 bits for two channels at a reproduction level similarly to current CD by using audio data compression/extension techniques. In this method, the information content to be recorded and reproduced is compressed up to 1/5, signals are recorded in an optical disk or magneto-optical disk, and the information read out for reproduction is extended to realize the similar audio performance as a CD.

This method has the following main specifications: the disk diameter is 64 mm, the track pitch is 1.6 µm, audio data can be recorded or reproduced for up to 74 min, and the linear velocity of the disk is 1.2 to 1.4 m/sec. As to the audio signal performance, two stereo channels are used, the frequency band ranges from 5 to 20 KHz, the dynamic range is 105 dB, and the magnetic field modulation method as described above is used as the recording method. Moreover, in the case of the signal format, the sampling frequency is 44.1 KHz, EFM (Eight to Fourteen Modulation) the same as that of a CD is used as the modulation method, and CIRC (Cross Interleave Reed-Solomon Code) is used as the error correction method.

Furthermore, ATRAC (Adaptive Transform Acoustic Coding) is used as the high-performance coding method. This method demarcates analog-digital-converted audio data with a time frame of 11.6 msec, divides the data into a plurality of frequency bands by means of a MDCT (Modified Discrete Cosine Transform) operation to convert them into frequency axes by MDCT and thereafter decrease the quantity of the data by using the acoustic sense of a person to compress them up to the data quantity of approx. 1/5. Therefore, though the recording density of the magneto-optical disk is the same as that of a CD, it is possible to decrease the disk diameter necessary to record/regenerate data for up to 74 min. to 64 mm which is much smaller than that of the CD.

The following is the result of studying major features of the above optical disk recorder. To reproduce data from a CD, the CD has to continuously send signals of 1.4 Mbit/sec to a digital-analog converter (DAC). Therefore, reproduced signals must be read out of the CD in real time. In the case of a recorder using the data compression/extension technique, because the quantity of the data is compressed to approx. 1/5, 0.3 Mbits/sec is enough to decode a signal read out at the rate of 1.4 Mbits/sec since it is a compressed signal. Therefore, it is only necessary to intermittently read signals from the disk.

Thus, by storing signals read out of an optical disk in a storage circuit such as a buffer memory, it is possible to reproduce all the audio signals stored in the storage circuit. Therefore, if the tracing of an optical pickup is deviated from the original position due to vibrations of the optical disk recorder, out-put of second would be interrupted in the case of a CD but sound interruption does not occur in the case of the storage circuit storing data while the optical pickup recovers from the trouble. The interruption out-put of second does not occur as the optical pick-up returns to the original position on the optical disk and continuously reads signals while data is read out of the storage circuit and continuously reproduced.

By using the above storage circuit and data compression/ extension techniques, another major feature is obtained. In the case of a CD, one piece of music, that is, track is always formed in consecutive areas on an optical disk as a group. However, in the case of the above magneto-optical disk system, one piece of music (tracks) can be formed even by dividing and recording plurality of block record data in random areas on an optical disk. This is because there is an idle time since the transfer rate necessary to decode a compressed signal is 0.3 Mbits/sec though signals are read out of the optical disk at the transfer rate of 1.4 Mbits/sec. Therefore, audio signals can be continuously outputted by reading signals out of the optical disk during the idle time and store them in the storage circuit, and thereafter moving the optical pickup up to a remote area on the optical disk (the block record data next to the track comprising separate plurality of block record data) to read signals out of the optical disk and storing them in the storage circuit before the storage circuit becomes empty.

Similarly, the same piece of music (tracks) can be continuously reproduced even if continuous audio signals are recorded in separate areas on the optical disk. The state showing that one track comprises a plurality of small-block record data (a plurality of record data in a recording block comprising continuous areas are separately present on an optical disk) is entered at a predetermined position of the optical disk as table-of-contents information. Therefore, to change the number of pieces of music or to perform editing such as dividing of a piece of music into two pieces of music, a waiting time is produced for the actual elapsed time of a position to be changed. In the case of the optical disk recorder, however, it is possible to easily change numbers by rewriting the composition information (linking information) of a piece of music in a certain area with the above table-of-contents information. Therefore, for editing, a major advantage is obtained by using the data compression/ extension technique.

As described above, in the case of a magneto-optical disk recorder (hereafter referred to as MD), one track comprises a plurality of pieces of small-block record data (a plurality of pieces of small-block record data comprising continuous areas are separately present on an optical disk). These continuous pieces of information for music are present for each track and recorded and entered in a predetermined area of an MD as table-of-contents information. Hereafter, a predetermined area in which table-of-contents information is recorded is referred to as a UTOC (User Table of Contents) area.

It is possible to record not only the constitution information of each track but also additional information such as the year and date when data is recorded in each track, the name of an optical disk, and the name of a track in the UTOC area.

However, the timing for recording the table-of-contents information (linking information) of a track to be recorded in the UTOC area is not decided before recording of the recorded track is finished. This is because the amount of time that is recorded in the recorded track is unknown and thereby the end point of the track cannot be decided.

Therefore, hitherto, the table-of-contents information of the track of a recorded piece of music is recorded in the UTOC area when a recording-stop command key provided on an optical disk recorder (such as an MD) is pressed. However, when the power supply of the optical disk recorder is turned off due to outage while data is being recorded in the track, the information recorded in the track cannot be reproduced later because the table-of-contents information of the track record data is not recorded in the UTOC area of the MD.

This is because a signal for recording a piece of music in a track is recorded in a user's recording area but the entire information for controlling the area is saved in the UTOC area. An actual recording signal is completely separated from the table-of-contents information serving as control information. Therefore, it is impossible to reproduce the table-of-contents information of a track, that is, the block record data recorded in the track just before the power supply is turned off, because there is no way to know the information showing the position of the user's recording area in which the block record data is present.

In this case, only one track fails in reproducing data. If the power supply is turned off while continuously recording block record data in a plurality of tracks (a piece of music) by recording data in the tracks and simultaneously incrementing them (increase of one track) or before recording table-of-contents information, the tracks in which the table-of-contents information is not recorded also fail in reproducing data. Therefore, problems occur that the entire time used to record the block record data in tracks comes to nothing and the recorder results in an apparatus having bad usage conditions.

SUMMARY OF THE INVENTION

The present invention is made to solve the above problems and a first object is to provide an optical disk system making it possible to record table-of-contents information data in an area other than a user's recording area while recording block record data in the user's recording area of an optical disk and reproduce the block record data currently recorded in accordance with the table-of-contents information data even if the power supply is turned off during recording of the block record data.

A second object of the present invention is to provide an optical disk system making it possible to record table-of-contents information in an area other than a user's recording area, that is, the UTOC area before recording block record data in the user's recording area of an optical disk or starting the recording of the block record data, or before the information about the start of the block record data and the information about linking and end positions of plurality of small-block record data constituting the block record data are decided and reproduce the recorded information in accordance with the table-of-contents information recorded in the UTOC area even if the power supply is turned off while the block record data is being recorded.

A third object of the present invention is to provide a simple optical disk system without using a special write signal by writing table-of-contents information in the UTOC area when a block record data changing command data is given.

A fourth object of the present invention is to provide an optical disk system which makes it possible to easily record a sound signal of a CD in every track of an optical disk by writing table-of-contents information to be written in the UTOC area; that is, the information about linking and end positions of small-block record data when detecting a user's bit with a digital audio interface receiving circuit and receiving a track number and connecting a CD player with an optical disk recorder.

The fifth object of the present invention is to provide an optical disk system making it possible to record a sound signal of a DAT (digital audio tape) in an optical disk by writing table-of-contents information to be written in the UTOC area, that is, the information about linking and end positions of small-block record data when detecting a user's bit with a digital audio interface receiving circuit, and receiving the ID of a DAT, and connecting the DAT with an optical disk recorder.

The sixth object of the present invention is to provide an optical disk system making it possible to easily record table-of-contents information, that is, the information about linking and end positions of small-block record data in the UTOC area by writing the table-of-contents information when detecting the predetermined level of the record data to be inputted to an optical disk recorder and only detecting the level of input data.

The seventh object of the present invention is to provide an optical disk system making it possible to record table-of-contents information in an area other than a user's recording area of an optical disk before recording block record data in the user's recording area or starting the recording operation or before the table-of-contents information of the block record data is decided and to reproduce the block area data being recorded in accordance with the table-of-contents information data even if the power supply is turned off while the block record data is recorded. The eighth object of the present invention is to provide an optical disk system making it possible to record more-securely decided table-of-contents information and reproduce block record data by recording the table-of-contents information of the block record data in the UTOC area again after recording the block record data in a user's recording area or when the block record data is decided.

The ninth object of the present invention is to provide an optical disk system making it possible to increase the access speed by using the start position information of an optical disk in unused areas for plurality of block record data and the innermost recordable area of the optical disk among a plurality of recordable areas serving as empty blocks recorded as unused blocks as the start position of small-block record data when recording the record block data in the UTOC area before recording the record block data in a user's recording area or starting the recording operation or before the table-of-contents information of the block record data is decided, recording and linking plurality of data in order toward the outside of the optical disk, recording the small-block record data up to a most-recordable position, and recording the start position information of the block record data and the linking and end information of plurality of small-block record data in the UTOC area as the table-of-contents of the small-block record data.

The tenth object of the present invention is to provide an optical system making it possible to avoid frequent access of an optical pickup by recording no data in empty blocks with less than a predetermined length (time) as unrecordable empty blocks among a plurality of empty blocks recorded as unused blocks.

An optical disk system comprises disk means having a user recording area and a user table-of-contents area; input means for inputting at least one of a block record data, table-of-contents information data, a command;recording-reproducing means for recording/reproducing said block record data and table-of-contents information data received from said input means; storage means for storing said block record data and said table-of-contents information data; and system control means for controlling the writing-reading of said table-of-contents information data into and out of the storage means, and the recording-reproducing of said data onto and from said disk means, said recording including the recording of said table-of-contents information data onto the user table-of-contents area of said disk means after the system control means receives said command by said input means while the system control means is controlling the writing of said block record data and the said table-of-contents information data into the storage means.

According to the present invention, an optical disk system is obtained which makes it possible to record table-of-contents information in an area other than a user's recording area of an optical disk while recording block record data in the user's recording area and to reproduce the block record data being recorded in accordance with the table-of-contents information, even if the power supply is turned off while recording the block record data.

An optical disk system comprises disk means having a user recording area and a user table-of-contents area; input means for inputting at least one of a block record data, a table-of-contents information data, a command; recording-reproducing means for recording-reproducing said block record data and said table-of-contents information data received from said input means storage means for storing said block record data and said table-of-contents information data; and system control means for controlling the writing-reading of said table-of-contents information data into and out of the storage means, and the recording-reproducing of said data onto and from said disk means, said recording including the recording of a temporary table-of-contents information data onto the user table-of-contents area of the disk means before said recording-reproducing means records the block record data onto the recording area of the disk means or the system control means receives the command produced by the input means.

According to the present invention, an optical disk system is obtained which makes it possible to record table-of-contents information data in an area other than a user's recording area of an optical disk before recording block record data in the user's recording area or starting the recording operation, or before the table-of-contents information of the block record data is decided, and to reproduce the table-of-contents information of the block record data being recorded in accordance with the table-of-contents information data even if the power supply is turned off during the recording of the block record data.

BRIEF DESCRIPTION OF THE DRAWINGS

FIG. 2 is an illustration of the UTOC of an optical disk used for the optical disk recorder of the present invention;

FIG. 4 is an illustration showing the table for table-of-contents information read from the UTOC area under the recording state shown in FIG. 3;

FIG. 6 is an illustration showing the table for table-of-contents information to be recorded in the UTOC area under the recording state shown in FIG. 5;

FIG. 9A is a table for explaining FIG. 8;

FIG. 9B is a table for explaining FIG. 8; and

DESCRIPTION OF THE PREFERRED EMBODIMENTS

Embodiments

The following is the description of the constitution of the optical disk system of the present invention making it possible to record data on and/or regenerate the data from the MD with the existing constitution rotatably set in a cartridge being 68×72×5 mm in size.

Figure 1:
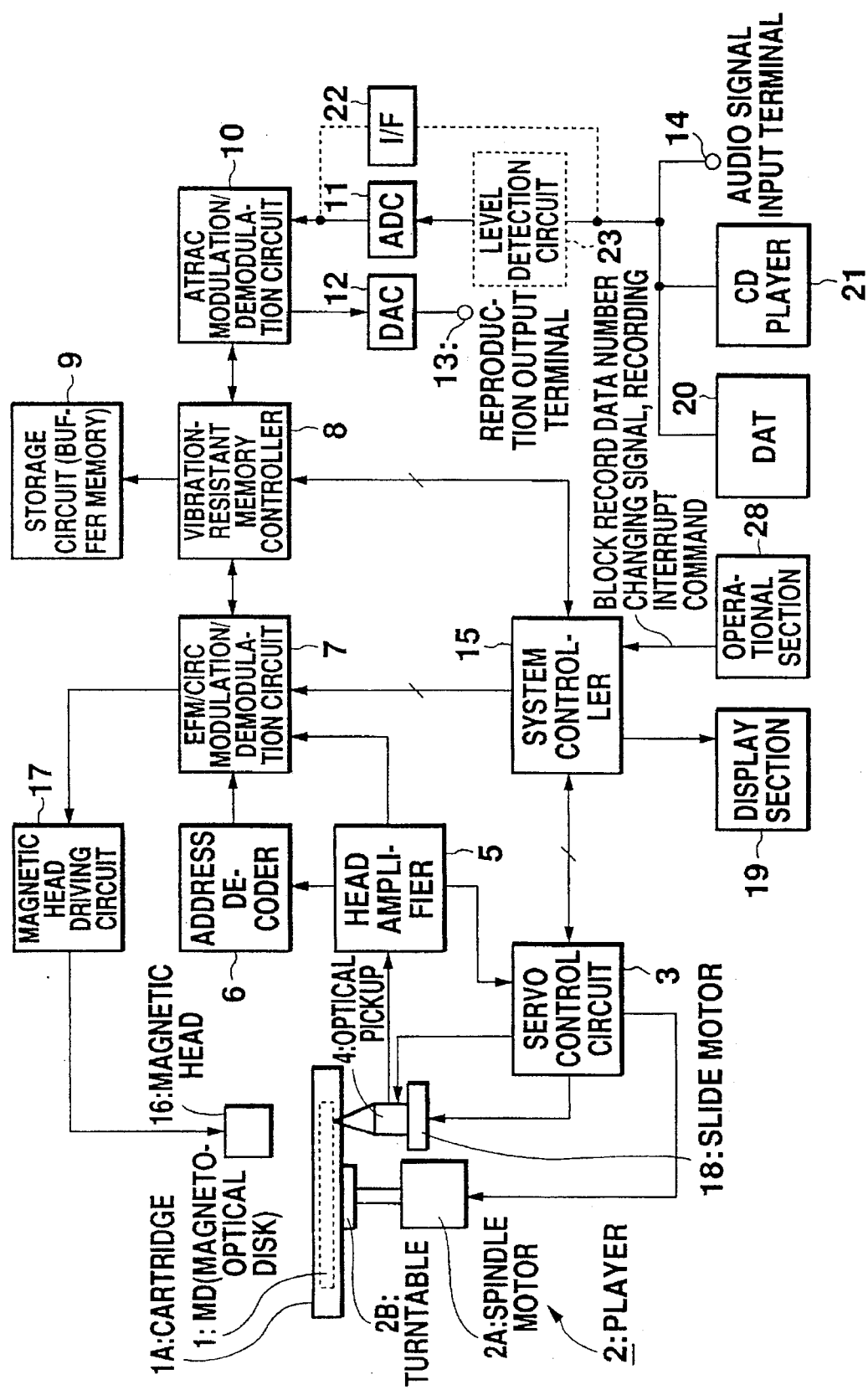
FIG. 1 is a system diagram showing an embodiment of the optical disk recorder of the present invention.

FIG. 1 is a system diagram showing an embodiment of the optical disk system of the present invention, in which symbol 1 represents a MD serving as a magneto-optical disk. MD1 is rotatable in a cartridge 1A, which is brought onto a turntable 2B of a recorder 2 by loading the cartridge 1A into an optical disk recorder. The MD1 is secured onto the turntable 2B at the center and rotated by a spindle motor 2A. An optical pickup 4 is set under the cartridge 1A and a magnetic head 16 is set above the cartridge 1A. An optical pickup 4, which emits a laser beam, is freely slid in the cross direction of the MD1 by a slide motor 18 by opening a shutter provided on the cartridge 1A. A magnetic head 16 serves as a magnetic-field generating section for applying an N- or S-pole magnetic field corresponding to a recording signal, to be described later to the MD1.

A servo control circuit 3 controls the spindle of the spindle motor 2A, the slide of the slide motor 18, the focusing and tracking of the optical pickup 4, and the out-put power of a semiconductor laser in the optical pickup 4. The spindle motor 2A is CLV(Constant Linear Velocity)-controlled by the spindle circuit in the servo control circuit so as to have a necessary rotational speed.

The slide motor 18 slides the optical pickup 4 in the radial direction of the MD1 by a slide motor control circuit in the servo control circuit 3. Moreover, for the optical pickup 4, focusing, tracking, and semiconductor laser on/off are controlled by a focusing control circuit, tracking control circuit, and laser controlling circuit in the servo control circuit 3.

First, a method for reproduction is described below. The recorded information of the MD1 is read by the optical pickup 4 and added to an address decoder 6 and EFM/CIRC modulation/demodulation circuit 7 through a head amplifier 5. The address decoder 6 detects and decodes the address information superimposed on a CLV-control sine-wave signal obtained from a guide groove previously formed on the MD1. The output of the address decoder 6 is added to the EFM/CIRC modulation/demodulation circuit 7. The EFM/CIRC modulation/demodulation circuit 7 demodulates EFM and CIRC and its output is inputted to a vibration-resistant memory controller 8.

The vibration-resistant memory controller 8 has the function of accumulating the data inputted for regeneration and sent from the EFM/CIRC modulation/demodulation circuit in the storage circuit 9, such as a buffer memory, and the readout function for sending compressed data to an ATRAC modulation/demodulation circuit 10 to demodulate the data. The ATRAC modulation/demodulation circuit 10 demodulates the compressed data, sends the demodulated data to a DAC (digital-analog converter) 12, and outputs an audio output to a reproduction output terminal 13.

The way of a recording signal will now be described below. A record audio input signal is inputted from an input terminal 14 and converted into digital data by an ADC (analog-digital converter) 11. The digital data is converted into the above compressed data by the ATRAC modulation/demodulation circuit 10 and stored in the storage circuit 9 through the vibration-resistant memory controller 8 as record compressed data. When the data is stored in the storage circuit 9 up to a predetermined quantity, record data is recorded in the MD1. That is, the vibration-resistant memory controller 8 reads stored data out of the storage circuit 9 and outputs the data to the EFM/CIRC modulation/demodulation circuit 7.

The EFM/CIRC modulation/demodulation circuit 7 modulates the out-put signal of the storage circuit 9 and sends its output to a magnetic head driving circuit 17. The magnetic head driving circuit 17 generates an N- or S-pole magnetic field corresponding to a record EFM signal and adds the magnetic field to the MD1 through the magnetic head 16. The laser of high power for recording outputted through the servo control circuit 3 is applied to the MD1 from the optical pickup 4 arranged inversely to the MD1 in accordance with a command outputted from the system controller 15. A recording signal is recorded in the MD1 by the magnetic field generated by the magnetic head 16 above the MD1 and the laser generated by the optical pickup 4 as described above.

A slide control signal sent from the system controller 15 is added to the slide motor 18 through the servo control circuit 3, and moves the optical pickup 4.

In the case of the system controller 15, command signals for the entire control such as recording, reproduction, and searching operation of the optical pickup 4 and a signal for detecting address information of the MD1 are connected with the servo control circuit 3, EFM/CIRC modulation/demodulation circuit 7, and vibration-resistant memory controller 8 through buses and control data is exchanged. Symbol 28 represents the input unit for the system controller 15, which is an operational section out-putting various command signals and having numerical keys and 19 represents a display such as a liquid crystal display for displaying various data sent from the system controller 15.

Moreover, this embodiment, as described later, is constituted so as to connect a CD player 21 or a digital audio tape recorder (DAT) 20 or the like in parallel with an audio signal input terminal 14 and, as shown by a broken line in FIG. 1, to set an audio interface receiving circuit 22 between the ATRAC modulation/demodulation circuit 10 and the output interface of the DAT 20 or CD player 21 or to set a level detection circuit 23 between the audio signal input terminal 14 and the ADC 11.

Operations of the optical disk recorder with the above constitution are described below. The format to be recorded in tracks on the recording film of the MD1 used for this embodiment is constituted as shown in FIG. 2. That is, the format covers the range from the innermost track 1B of the MD1 to read-in 1D, UTOC area 1E, user's recording area 1F for recording audio data or the like, track number (piece-of-music number) area 1G, and read-out 1H of the MD1 and the outermost track 1C of the MD1. Addresses A to L shown in the right table are provided in the user's recording area 1F for each music number, for example, from 1 to 6, and table-of-contents information serving as the addresses of the tracks (piece of music) recorded in the user's recording area 1F is recorded in the UTOC area 1E.

Figure 3:
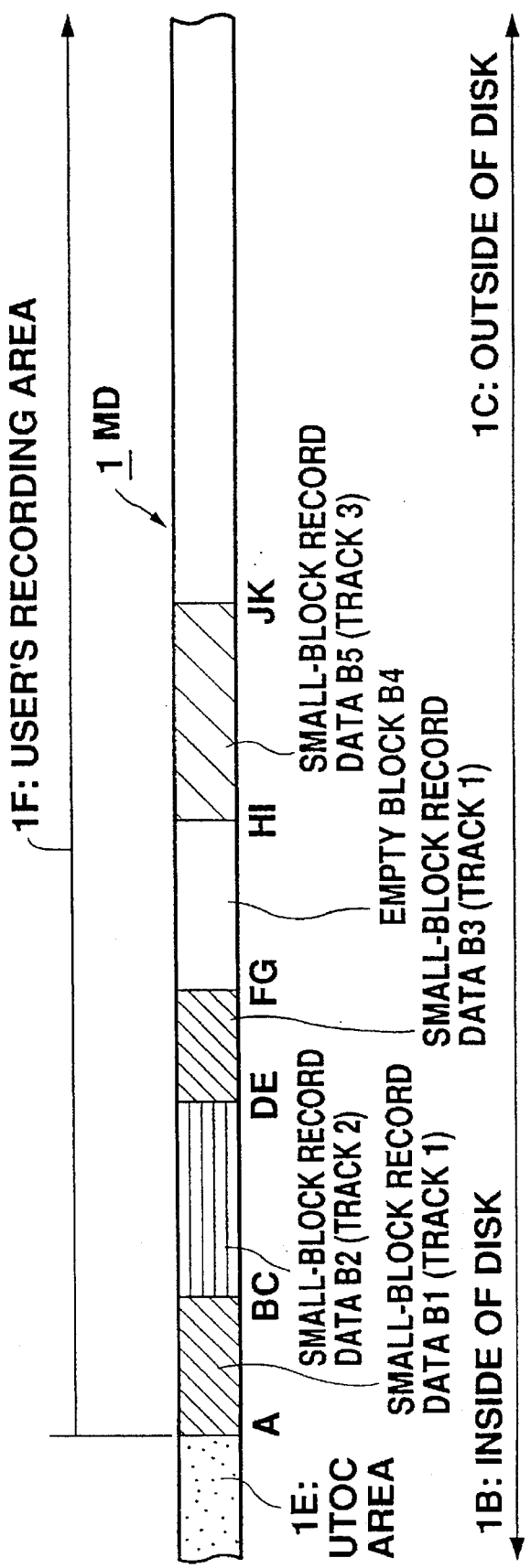
FIG. 3 is a radial sectional view of the state in which data is recorded up to the third track viewed from the side of a mini disk (MD) to which the optical disk recorder of the present invention is applied.

FIG. 3 is a radial sectional view showing the state viewed from the lateral of the disk in which data such as audio data or the like is recorded up to the third track (piece-of-music numbers 1 to 3) is recorded in the user's recording area 1F of the above MD1 before recording. In the case of the MD1, because one track comprises plurality of small-block record data (pieces of small-block record data comprising consecutive areas on an MD are separately present on the MD), this state (composition information of a piece of music) is recorded and entered in the UTOC area 1E as table-of-contents information. In this case, it is assumed that A, B, C, D, E, F, . . . , and K in FIG. 3 respectively show the start or end position address of each piece of small-block record data.

By inserting the MD shown in FIG. 3 into the optical disk system in FIG. 1, the optical pickup 4 moves to the UTOC area 1E of the MD1 in order to read the table-of-contents information of each track (piece of music) recorded in the UTOC area 1E and the pickup data outputted from the optical pickup 4 is stored in the storage circuit 9 from the EFM/CIRC modulation/demodulation circuit 7 through the head amplifier 5 and the vibration-resistant memory controller 15. Thereafter, the system controller 15 reads the read table-of-contents information of each track through the vibration-resistant memory controller 8.

FIG. 4 is a table of the recording state of the block record data shown in FIG. 3, which shows the table-of-contents information of each track (piece of music) read from the above-mentioned UTOC area 1E. In FIGS. 3 and 4, the track 1 comprises small-block record data B1 which starts at the start position address A and ends at the end address B and small-block record data B3 which starts at the start position address E and ends at the end address F. Therefore, the small-block record data B1 is first reproduced and then the small-block record data B3 is reproduced from the track 1. Thus, the track 1 comprises two types of small-block record data.

The track 2 comprises only the small-block record data B2 which starts at the start position address C and ends at the end address D. Needless to say, only the small-block record data B2 is reproduced from the track 2.

Similarly, the track 3 comprises only one small-block record data B5 which starts at the start position address I and ends at the end address J. Also, the track 3, similarly to the track 2, ends by reproducing only the small-block record data B5, and plurality of track linking information 31 to 33 are obtained.

The information in the UTOC area 1E includes the empty block 34 in FIG. 4. The empty block 34 is recorded as the empty block B4 which does not belong to any track which starts at the start position address G and ends at the end address H. This empty block 34 is used to record other tracks (pieces of music) later. Therefore, in this embodiment, the small block B4 is an empty block 34.

Moreover, the information in the UTOC area 1E is registered as information to be used to record subsequent tracks (pieces of music) similarly to the empty block 34 because no data is recorded from the address K to the outermost track 1C of the MD1 in FIG. 3. The start address 35 in the unrecorded area in FIG. 4 is located after the address K.

The linking information 31 to 33, empty block information 34, and unrecorded area information 35 in the above tracks are read by the system controller 15 in FIG. 1 and used to record data in tracks (pieces of music) in the future.

The following is the description of a case of recording data in track 4 downward, when other data is already recorded up to track 3 of the MD1. When the system controller 15 in FIG. 1 receives a recording stand-by command through the operational section 28, it reads data from the UTOC area 1E and recognizes that the above-mentioned empty block B4 in FIG. 3 and its subsequent blocks are areas in which data is recorded as outer tracks after the start address K of the unrecorded area.

Thereafter, the system controller 15 in FIG. 1 receives a recording start instruction from the operational section 28 to perform the operation to start recording. That is, the controller 15 starts converting a record input signal sent from the audio signal input terminal 14 in FIG. 1 into digital data, using the ADC 11, and storing data, obtained by compressing and converting record digital data, in the storage circuit 9 using the vibration resistant memory controller 8 through the ATRAC modulation/demodulation circuit 10.

Recording is started from the start address G of the empty block B4 of the MD1 shown in FIG. 3 until a predetermined quantity of record data is stored in the storage circuit 9. The flow of record data to be recorded in the MD1 has been previously described. While input data is being recorded in the MD1, it is a matter of course that record data to be inputted is stored in the storage circuit 9. As described in the section of the Related Art, data is intermittently recorded in the MD1 because the transfer rate of the recorded compressed data compressed up to approx. ⅕ to the MD1 is 0.3 Mbits/sec, though the transfer rate of the input signal to the ADC 11 is 1.4 Mbits/sec.

After intermittent recording of data in the MD1 is repeated and data is recorded up to the end address H of the small block B4 which is the empty block 34 in FIG. 3, small-block record data next to track 4 comes to an area starting with the start address K of an unrecorded area.

When the system controller 15 in FIG. 1 receives a block record data number changing command, issued in order to change the track numbers from 4 to 5 while recording data in track 4, it recognizes that the input signal is changed to track 5. In this case, although the recording signal stored in the storage circuit 9 is still the record data in the track 4, it also manages the start time of the recording signal in track 5 and controls the part of the record data stored in the storage circuit 9 which should be started as the record data in track 5. The signal also recognizes the recording end address (end address of the small-block record data on the MD) of track 4. Therefore, in this case, the table-of-contents information in track 4 is decided. In general, to add a piece-of-music number (track number) to a audio signal inputted in real time, the number is not decided until a piece-of-music number changing signal or a recording stop signal is received, except when the time of a voice signal to be previously recorded is decided. Therefore, the above method is adopted.

Figure 5:
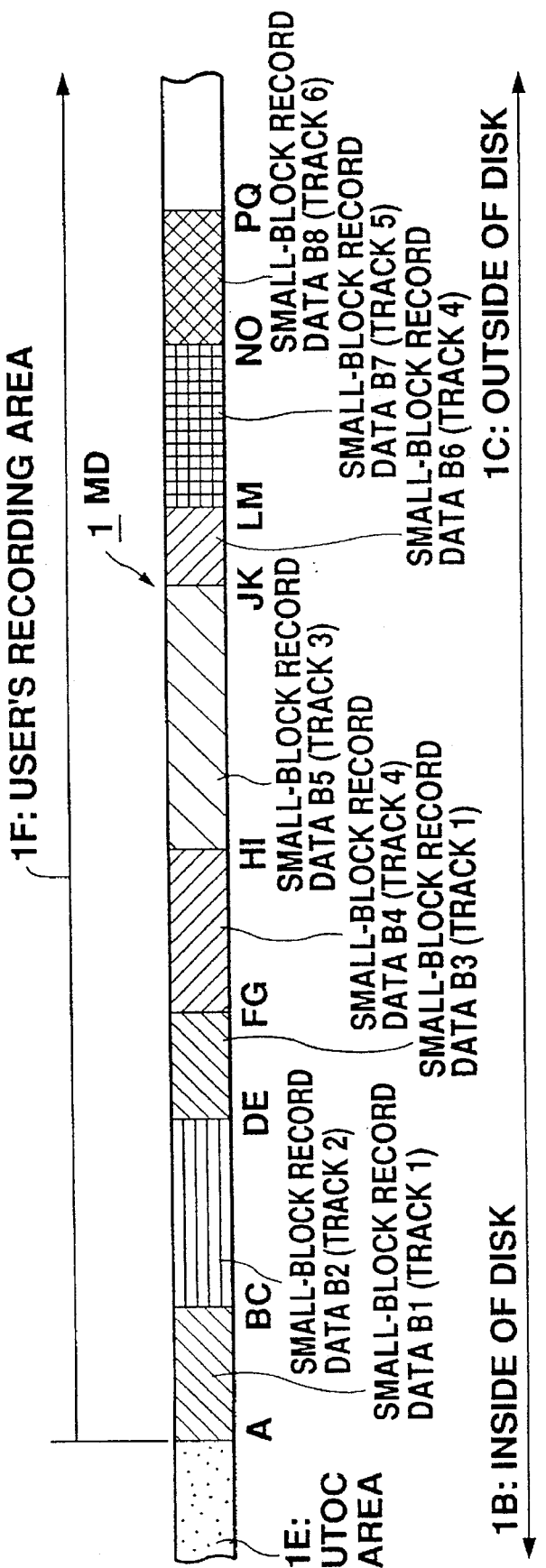
FIG. 5 is a radial sectional view of the state in which data is recorded up to the sixth track viewed from the side of a MD to which the optical disk recorder of the present invention is applied.

In this case, when the recording end address of track 4 is the address L in FIG. 5, the address of two types of block record data constituting track 4 are decided, together with the small block B4 which starts at the start position address K in which the end address L serves as the block record data in track 4, and starts at the start position address G which is the empty block 34 before data is recorded in track 4 and ends at the end address H.

On the Related Art, if the power supply of the optical disk recorder is turned off while data is recorded in track 5, the table-of-contents information in track 4 can be recognized only up to track 3 when the data in the MD1 is reproduced later because the connection information (table-of-contents information) of the small-block record data constituting track 4 is not yet recorded in the UTOC area 1E of the MD1, although the system controller 15 in FIG. 1 recognizes the information. Therefore, data can be reproduced only up to track 3. This is the same as the first recording state of the MD1 shown in FIG. 3. Though recording of data in track 4 is completed after the expending of considerable time, it is resultingly recognized that no data is recorded in track 4 because the table-of-contents information of track 4 is not recorded. Track 5 can be given up because data recording is not completed. However, it is a large disadvantage of the optical disk system that data cannot be reproduced from the track 4 in spite of the expending of considerable time.

Therefore, an embodiment of the present invention records the table-of-contents information of track 4 in the UTOC area 1E of the MD1 when the system controller 15 in FIG. 1 receives the command for changing the track numbers in block record data, that is, when the table-of-contents information of track 4 is decided. Therefore, the system controller 15 in FIG. 1 moves the optical pickup 4 to the UTOC area 1E of the MD1 and records the table-of-contents information saved for the tracks 1 to 4 in the UTOC area 1E. As for the information for tracks 1 to 3, the controller 15 also records again the same information as that read out of the UTOC area 1E of the MD1 before recording data for track 4.

While the table-of-contents information including the data in track 4 is recorded in the UTOC area 1E, the input signal to be recorded in track 5 stores data in the storage circuit 9 simultaneously. Therefore, the recording signal of track 5 is not interrupted.

Similarly, because the system controller 15 in FIG. 1 changes the track numbers from 5 to 6 while recording data in track 5, the table-of-contents information of track 5 is decided when track number changing command is received. Therefore, the system controller 15 in FIG. 1 records the table-of-contents information saved in tracks 1 to 5 in the UTOC area 1E of the MD1.

When the system controller 15 in FIG. 1 receives a recording interrupt command from the operational section 28 while recording data in track 6, the controller 15 decide the table-of-contents information of track 6 and simultaneously records the entire record data stored in the storage circuit 9 in the MD1, although the stored data has not yet reached a predetermined quantity. Immediately after the recording is completed, the controller 15 records the table-of-contents information saved in tracks 1 to 6 in the UTOC area 1E of the MD1.

FIG. 5 shows the recording state of the above-mentioned MD1 and FIG. 6 shows the table of the table-of-contents information recorded in the UTOC area 1E at that time. There is no empty block 47 after data is recorded up to track 6. The start address of the unrecorded area 48 is the address Q downward. In this case, the number of pieces of small-block record data constituting tracks may come to two or more in plurality of linking information 41 to 46 of the tracks in FIG. 6. For example, track 1 comprises the small-block record data B1 and the small-block record data B3 and track 4 comprises the small-block record data B4 and the small-block record data B6. However, the tracks 2, 3, 5, and 6 comprise one small-block record data B2, B5, B7, and B8, respectively. These tracks may comprise more than two small blocks for track 1 or track 4.

If the power supply of the optical disk system is turned off while data is being recorded in the above track 6, the present invention makes it possible to reproduce the data up to track 5 because the table-of-contents information up to track 5 is already recorded in the MD1. In the case of the Related Art, however, it is impossible to reproduce the data in track 4 downward. Therefore, when data is continuously recorded in tracks, the present invention shows a large advantage.

In the above constitution, the means for deciding the linking information and end positions of plurality of small-block record data constituting block record data is constituted so as to decide the table-of-contents information of the track recording data when the system controller 15 in FIG. 1 receives a track number change command. The following is the description of another embodiment of this invention.

The second embodiment of the present invention is constituted so as to receive an input signal for recording the timing for deciding the linking information and end positions of tracks in the MD1 by a digital audio interface receiving circuit (I/F) 22, detecting and deciding a user's bit, and writing data in the UTOC area 1E.

That is, as shown by a broken line in FIG. 1, the digital audio interface receiving circuit 22 is set between the audio signal input terminal 14 and the ATRAC modulation/demodulation circuit 10 instead of the ADC 11. Because a digital audio interface signal has a user's bit transferred together with audio data, the user's bit is detected to perform the above decision operation (recording of decided table-of-contents information in the UTOC area) when detecting that track number change. In the case of a CD, it is possible to output a track number as the user's bit. Therefore, when connecting the CD player 21 to an optical disk recorder as a sound source, the above usage is possible and music signals of the CD can be recorded in the MD1 for every track.

Moreover, as one of the purposes for using the digital audio interface receiving circuit 22, an optical disk recorder currently recording data in tracks changes track numbers when receiving an ID sent from the DAT (digital audio tape recorder) 20 by connecting the DAT 20 to an optical disk system as a sound source, receiving the digital interface output of the DAT 20 by the digital interface receiving circuit 22 of the optical disk system, and detecting the ID as a user's bit. That is, it is possible to decide the linking information and end positions of tracks currently recording data.

The audio data sent from the DAT 20 or CD player 21 is inputted in the ATRAC modulation/demodulation circuit 10 and the user's bit is outputted to the system controller 15. Then, the system controller 15 detects the user's bit while recording data in tracks, changes the number of the tracks currently recording data, and decides the linking information and end positions of the tracks.

The third embodiment of the present invention is described below. This embodiment is constituted so as to process a predetermined level of a record input signal as a track number change command by a detected output signal in order to decide the linking information and end positions of plurality of small-block record data constituting block record data. In FIG. 1, the decision can easily be performed by setting a level detection circuit 23 between the audio signal input terminal 14 and the ADC 11 as shown by a broken-line block and inputting a level detection signal from the circuit 23 to the system controller 15.

Figure 7:
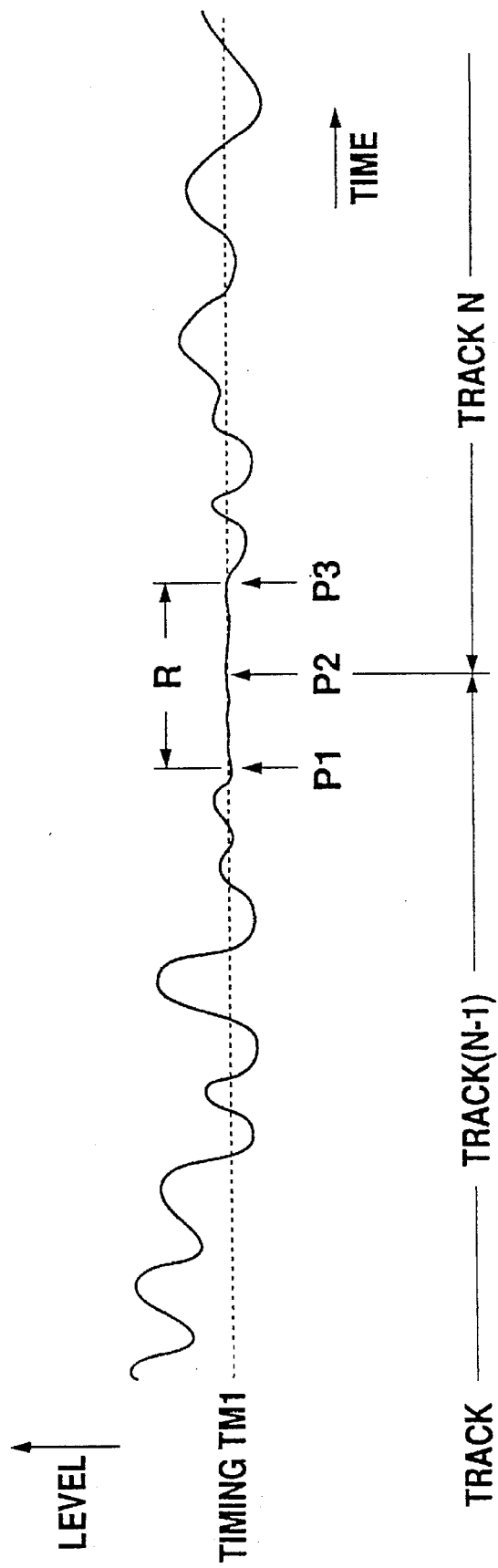
FIG. 7 is a chart showing the level detection timing when data is recorded in the optical disk recorder of the present invention.

FIG. 7 shows a timing chart for level detection under recording, which explains the level detecting operation of the level detection circuit 23. In FIG. 7, the horizontal axis shows time and the vertical axis shows output level. The middle of waveforms shows a mute level. It is assumed that the range R is under the state where a signal is extremely low (mute state). When an optical disk recorder currently records data in track N-1, a predetermined level is detected at the point P1 of the timing TM1 of a record input signal. This point detects the start position of the mute state of the record input signal. After the mute section in the range R continues, the above predetermined level is detected at the point P2 again. This point is the end position of the mute state. That is, this point shows the beginning of a audio signal corresponding to a new track. However, when track number change command is received at the point P1 as the end position of track N-1 and the track numbers are changed from N-1 to N, a mute portion of the range R is generated at the start portion of track N. However, when the track number are changed at the point P2, a mute portion is generated at the end portion of track N-1. Therefore, in the case of this embodiment, a command for changing track number is generated at the point P3. Differently from the above method, it is possible to use a method of deleting the range R without making it belong to any track. In any case, it is necessary to make the system controller 15 in FIG. 1 control the time positions of the points P1 and P2 so as to generate the timing for changing track number. As described above, it is possible to decide the linking information and end positions of track currently recording data in accordance with the track number change command by detecting the level of a recording signal.

Figure 8:
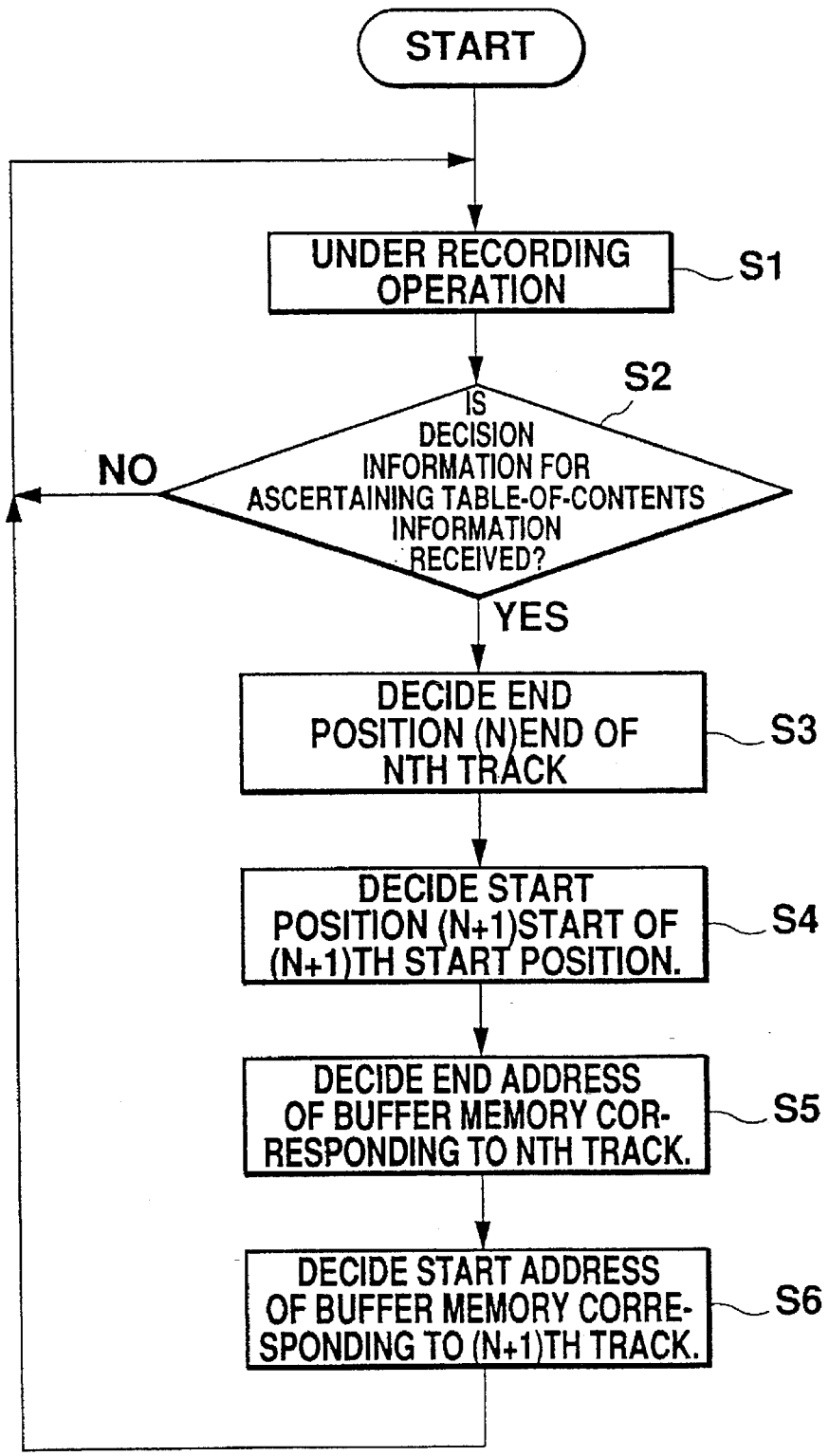
FIG. 8 is a flow chart showing the recording operation of the optical disk recorder of the present invention.

The entire operation of the optical disk systems described as the first to third embodiments is described below in accordance with the tables in FIG. 8 and FIGS. 9A and 9B.

First, a case is considered in which recording of small-block record data of the start address, (N) start, in the Nth track of the user's recording area 1F of the MD1 is started as shown in FIG. 9A.

The system controller 15 of the optical disk system shown in FIG. 1 always judges whether to receive decision information for decision table-of-contents information as shown in the second step S2 during the recording operation in the first step S1.

As previously described, the decision information for deciding the table-of-contents information is a track number changing signal, CD user's bit, ID from DAT as a user's bit and record data detected by the level detection circuit.

If the second step is in the state of NO in which the decision information for deciding table-of-contents information is not received, the step is returned to the first step S1. However, when the second step is in the state of YES, in which one of the above mentioned signals is received, the third step S3 is started.

When the end address, (N) end, of the small-block record data to be recorded for track N shown in the table in FIG. 9A is reached, and recording of data for the track N is ascertained, the next step S4 is started.

In the fourth step S4, the system controller 15 also receives and decides the next, (N+1)th, start address, (N+1) start, of the MD1.

In the next step S5, the end address, (N) M-end, stored in the storage circuit 9, corresponding to the Nth track, and shown in the table in FIG. 9B, is decided. Moreover, in the sixth step S6, the start address, (N+1) M-start, (see the table in FIG. 9B), corresponding to the (N+1)th track, is decided. Then, the first step S1 is restarted. Thus, the above operations are repeated.

As described above, by operating the constitution of the present invention, the block record data recorded in a table-of-contents area of an optical disk such as an MD can be reproduced even if the power supply of the recorder is turned off while plurality of block record data are continuously recorded in the optical disk because the block record data recorded until the power supply is turned off is already recorded in the table-of-contents area of the optical disk as table-of-contents information, except the block record data currently being recorded. Therefore, damage is minimized even if the power supply is turned off.

In the above embodiments, an optical disk system is described which records table-of-contents information in the UTOC area when a decision command for deciding the table-of-contents information is given during the recording of record data. However, an optical disk system constituted so as to record table-of-contents information in the UTOC area before recording record data or starting the recording operation or before the table-of-contents information of block record data is decided is described below in detail by referring to FIGS. 1 to 6 and FIG. 10.

Figure 10:
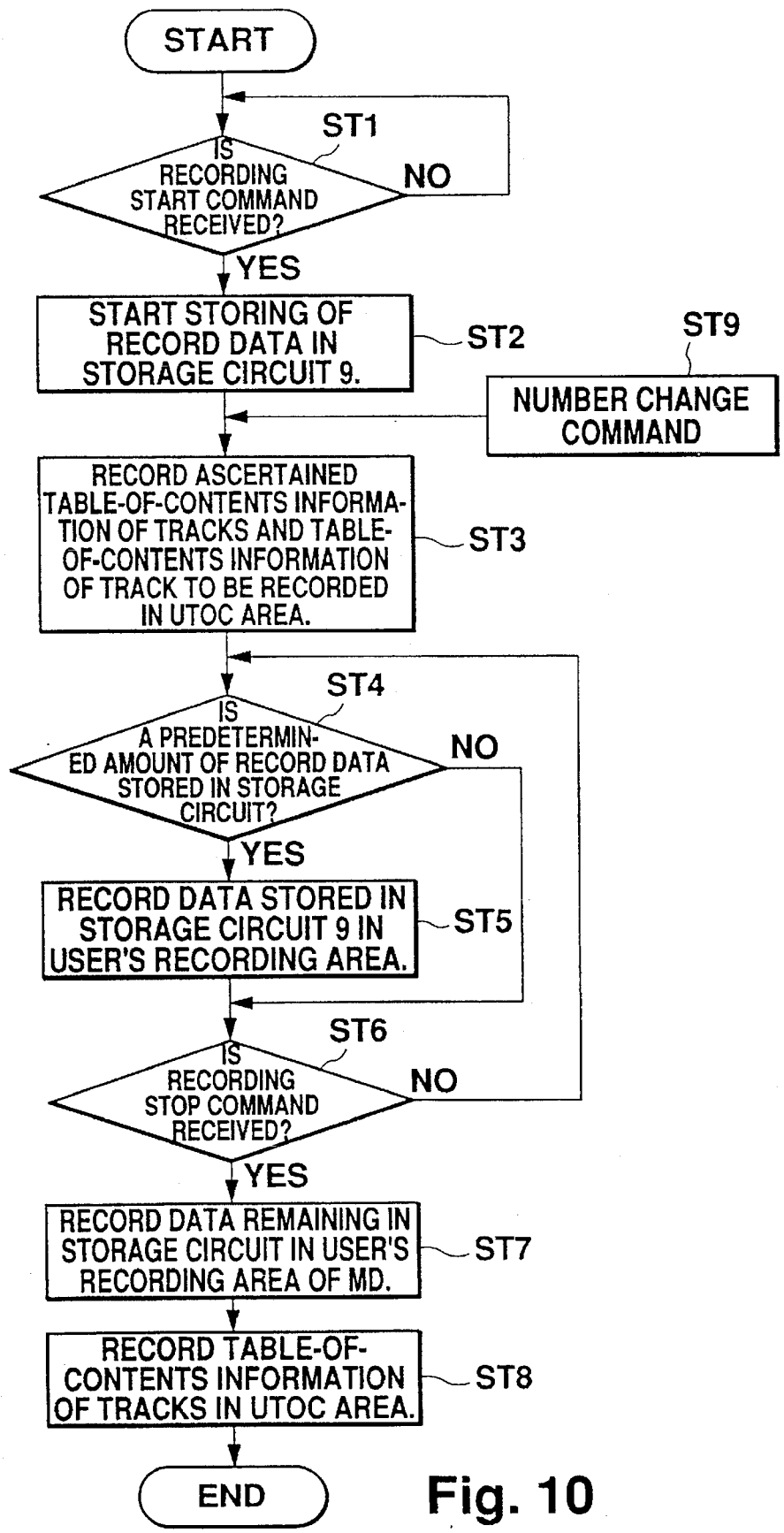
FIG. 10 is a flow chart showing the recording operation of another embodiment of the optical disk system of the present invention.

The following is the description of another example for recording data in the track 4 downward under the state in which record data is recorded in the user's recording area 1F up to the track 3 as described in FIGS. 2 to 4 by using the optical disk system shown as the system diagram in FIG. 1. FIG. 10 shows a flow chart of the recording operation of the present invention. In the first step ST1 in FIG. 10, the system controller 15 in FIG. 1 checks the receiving input of a recording start command after a recording stand-by command. Because an optical disk recorder is able to reproduce or record data from or in tracks, it requires a stand-by command to determine whether the first state is the recording mode or the reproducing mode and thereafter reproducing or recording is started by a reproduction start instruction or a recording start instruction.

When a recording stand-by command is received, the optical pickup 4 is moved to a recording position of the MD1 to wait for a recording start instruction. When a recording start command is inputted, the second step ST2 is started. That is, the recording operation is started. In the present invention, the recording operation includes the operations for recording record data in the MD1, storing the record data obtained by modulating an input signal into compressed data in the storage circuit 9, and recording the table-of-contents information of tracks in the UTOC area 1E. In the second step ST2, the operation for storing record data in the storage circuit 9 is started.

The operation in the second step ST2 is described below in accordance with the system diagram in FIG. 1. That is, a record input signal outputted from the audio signal input terminal 14 in FIG. 1 is converted into digital data by the ADC 11 to start the operation for storing the data obtained by compressing and converting the record digital data in the storage circuit 9. However, the input signal is not recorded in the user's recording area 1F simultaneously with a recording start command.

In the third step ST3, table-of-contents information of tracks is recorded in the UTOC area 1E. Recording the table-of-contents information of tracks in the UTOC area 1E and the contents of the recorded table-of-contents information are features of this embodiment. When data is recorded in track 4 in FIG. 3, data is recorded in the outside of the start address K of an unrecorded area by using the empty block B4 in FIG. 3 as small-block record data for start when the recording time exceeds the empty block B4.

Moreover, data may be recorded up to the maximum recordable area in track 4. Therefore, in this embodiment, track 4 comprises two pieces of small-block record data because the recording operation is started simultaneously with the current recording start command, the next small-block record data is started at the start address K starting with the head address of the unrecorded area as the linking information of the small-block record data of track 4 by using the empty block B4 as a start block, and the small block B6 whose end address ends with Z serves as the end block of track 4 when assuming the maximum recordable address of the MD1 as the address Z.

In this case, to prepare for a case in which data is maximally continuously recorded in track 4, the second piece of small-block record data of track 4 is started at the start address K and the maximum recordable address Z of the MD1 is used as the end address. Therefore, it is proposed to secure more tracks than the areas where data is actually recorded in the user's recording area 1F of the MD1. The details are described later.

Moreover, the two pieces of small-block record data constituting track 4 are first recorded in the empty block B4 and thereafter table-of-contents information is written to record the data in the unrecorded area so that tracks are formed by recording and linking input signals toward the outerside of the MD1, in order, up to the maximum recordable outerside position IC by using the innermost recordable area of the MD1 as the start small-block record data area, in order to connect them so that the moving distance of the optical pickup and access time are minimized when reproducing data from tracks later.

In two pieces of small-block record data constituting the track 4, the small block B4 which starts at the start position address G and ends at the end address H is an empty block which does not belong to any track. However, when the length of the empty block is less than a predetermined length (e.g. a time of 1/1,000 sec), it is possible to specify the block as an unrecordable block in which no data can be recorded.

When the first small-block record data of track 4 is recorded and linked with the next second small-block record data although the time of the area of an empty block is too short, it is necessary to stop the storing of data in the storage circuit 9 and to move the optical pickup to the position for next second small-block record data, because the first small-block record data passes before storing a compression signal when reading the first small-block record data and storing it in the storage circuit because the capacity of the first small-block record data is too small. Therefore, if the optical pickup is moved from the original position due to external vibrations when an adequate amount of compressed data is not stored in the storage circuit 9, reproduction of output of sound may be interrupted while the optical pickup is returned to the original position.

Therefore, when determining an empty block constituting tracks, it is possible to decrease the access time for reproduction by specifying an empty block having less than a predetermined length (time) as an unrecordable block.

As described above, the table-of-contents information of a track in which data is to be recorded is recorded in the UTOC area 1E in the third step ST3 in FIG. 10. In this case, however, decided table-of-contents information of tracks is also recorded. The decided table-of-contents information of tracks is defined as the table-of-contents information of tracks which is actually recorded in a user's recording area to reflect the area although the linking information (table-of-contents information) of the small-block record data of track 4 described above is prepared as temporary table-of-contents information to be recorded in the user's recording area 1F. Though the details are described later, there is not any decided table-of-contents information of tracks when the recording operation of track 4 is started, but there are only the table-of-contents information of tracks 1, 2, and 3 read out of the UTOC area 1E of the inserted MD1 and the temporary table-of-contents information of track 4 which just starts the recording operation.

In the fourth step ST4, it is a check whether or not a predetermined amount of data is stored in the storage circuit 9. If so, the data is recorded from the start address G of the previous empty block B4 of the MD1 shown in FIG. 3 for the first time in the fifth step ST5. The flow of the record data to be recorded in the MD1 is previously described. The amount of data to be recorded is only the amount of data stored in the storage circuit 9. When recording ends, the storage circuit 9 checks the stored amount of data in the fourth step ST4 through the sixth step ST6. It is a matter of course that inputted recording signals are stored in the storage circuit 9 while data is recorded in the MD1.

In the sixth step ST6, it is checked if a recording stop command is given. After recording of data up to the end address H of the small block B4, which is the empty block in FIG. 3, is completed, the small-block record data to serve as a recording signal is recorded in the area starting with the start address K of an unrecorded area.

If the power supply of the optical disk recorder is turned off while the recording operation of track 4 is performed around the outside of the start address K of the unrecorded area, the table-of-contents information of the track 4 can be recognized only up to track 3 in the UTOC area 1E even if regenerating data from the MD1 because the table-of-contents information of track 4, whose recording operation is not yet completed, is not recorded in the UTOC area 1E in FIG. 3. This is the same as the first state of the MD1. In the case of this embodiment, however, the table-of-contents information of track 4 can be reproduced because it is already recorded in the UTOC area 1E as table-of-contents information in the third step ST3 in FIG. 10.

However, as described in the third step ST3 in detail, the small-block record data constituting track 4 includes recorded small-block record data, although it is actually recorded table-of-contents information exceeding the user's recording area of the MD1, because the end information of the maximum recordable area is secured up to the address Z. Therefore, it is possible to regenerate data up to track 4 later. In the case of this embodiment, when reproduction reaches the user's recording area of the MD1, where no data is recorded while data is reproduced from track 4, it is possible to restore the real table-of-contents information of track 4 by deleting data after the address K in FIG. 3 (deleting the specified range of the track) because there must be no record data (no record data must be recorded) around the outside of the address K.

When the system controller 15 in FIG. 1 receives a track number change command, in order to change the track numbers from 4 to 5 while recording data in track 4, it recognizes that the track number is changed to track 5. In this case, the record data stored in the storage circuit 9, although it is still the record data of track 4, also manages the start time of the record data of track 5 and controls a position of the record data stored in the storage circuit 9 to be started as the record data of track 5. Moreover, the record data recognizes the recording end address of track 4. Therefore, in this case, the final table-of-contents information of track 4 is decided.

In this case, when assuming the recording end address of track 4 (end address of small-block record data) to be the address L as previously described, track 4 comprises two pieces of small-block record data, together with the small block B4 which starts at the start position address G and ends at the end address H, and is an empty block before data is recorded in the track 4, which start at the start position address K, and ends at end address L.

The above mentioned is described below in accordance with the recording operation flow chart in FIG. 10. That is, as shown in the ninth step ST9, a block record data number change command is inputted as an interrupt signal to the system controller 15 currently recording data. That is, in the third step ST3, the table-of-contents information of track 4 is decided, the temporary table-of-contents information of track 5 is generated, and these pieces of table-of-contents information are recorded in the UTOC area 1E. The table-of-contents information of track 4, as previously described, becomes a small block which starts at the empty block B4 and the start position address K and ends at the end address L as shown in FIG. 3. In the case of track 5, when assuming an address next to the address L serving as the recording end address of the track 4 as the address M, no data is recorded outside of the address M. Therefore, table-of-contents information is generated in track 5 which serves as a track comprising one of small-block record data which starts at the start position address M and ends at the maximum recordable address of the MD1, that is, the address Z which is previously described and recorded in the UTOC area 1E. Recording signals of track 5 are not interrupted while recording table-of-contents information of tracks in the UTOC area 1E, because the input signal to be recorded of track 5 is stored in the storage circuit 9 in FIG. 1 in parallel.

As previously described, when a track number changing command reaches track 5 while a record input signal is recorded, the table-of-contents information of track 4, in which data has been recorded so far, is decided. Therefore, the table-of-contents information of track 4 is recorded in the UTOC area 1E as temporary table-of-contents information before the recording operation of track 4 is started, the table-of-contents information of track 4 is decided, because the table-of-contents information is already decided. Accurate table-of-contents information can be read out by accurately recording the real table-of-contents information of track 4.

Because the system controller 15 in FIG. 1 changes the track number from 5 to 6 again while recording data in track 5 in the above manner, the table-of-contents information of track 5 is decided similarly when receiving a track number changing command. Therefore, track 5, for recording the ascertained table-of-contents information from tracks 1 to 5 and the temporary table-of-contents information of track 6, is formed in the UTOC area 1E. When assuming the end address of small-block record data to be N, track 5 is ascertained as a small block which starts at the start position address M and ends at the end address N.

When assuming an address next to the address N, which is the recording end address of track 5, as 0, the temporary table-of-contents information of the track 6 is not recorded outside of the address 0. Therefore, track 6 serves as a track comprising one small-block record data which starts at the start position address 0 and ends at the previously-described address Z to generate table-of-contents information and record the information in the UTOC area 1E.

When the system controller 15 in FIG. 1 receives a recording stop command while recording data in track 6, YES is Judged in the sixth step ST6 in the recording operation flow chart in FIG. 10 and the seventh step ST7 is started. In the seventh step ST7, unrecorded record data stored in the storage circuit 9 is recorded in the MD1. In the next eighth step ST8, the ascertained table-of-contents information of track 6 is recorded.

The table-of-contents information of tracks 4, 5, and 6, which have been recording data so far, is hitherto recorded in the UTOC area 1E in the eighth step ST8. Therefore, because the table-of-contents information of a track in which data is currently being recorded is not recorded in the UTOC area 1E, even when the track is still recording data, it is impossible to reproduce the data from tracks 4 to 6 when the power supply is turned off. However, the optical disk recorder of this embodiment makes it possible to securely reproduce data from tracks 5 and 6 in which the data is already recorded because the decided table-of-contents information and the temporary table-of-contents information of track 6 are recorded in the UTOC area 1E. Therefore, this embodiment has a large advantage when data is continuously recorded in tracks.

In the case of a system according to the Related Art, if the power supply is turned off before recording table-of-contents information, no data can be reproduced from any track in which the table-of-contents information is not yet recorded, and the entire time spent recording data in recording signal blocks comes to nothing, and the system is inferior in its usability. In the case of this embodiment, however, even if the power supply is turned off, it is possible to reproduce not only block record data which has been already recorded but also to block record data which is currently recorded. Therefore, an optical disk system with an improved usability is obtained.

In the above embodiments, an optical disk and magneto-optical disk including an MD are described. However, it is a matter of course that a magnetic disk such as a floppy disk is included as well as the optical disk of the present invention.

According to the present invention, block record data recorded in a table-of-contents recording area can be reproduced from an optical disk later, even if the power supply is turned off while recording record data as a plurality of pieces of block record data, because not only block record data having been already recorded but also block record data currently being recorded are recorded in the table-of-contents recording area of an optical disk, as table-of-contents information. Therefore, an optical disk recorder with an improved usability is improved even in an emergency situator such as a case in which the power supply is turned off.

What is claimed is:

1. An optical disk system comprising:
   disk means having a user recording area and a user table-of-contents area;
   input means for inputting at least one of a block record data, table-of-contents information data, a command;
   recording-reproducing means for recording/reproducing said block record data and table-of-contents information data received from said input means;
   storage means for storing said block record data and said table-of-contents information data; and
   system control means for controlling the writing-reading of said table-of-contents information data into and out of the storage means, and the recording-reproducing of said data onto and from said disk means,
   said recording including the recording of said table-of-contents information data onto the user table-of-contents area of said disk means after the system control means receives said command by said input means while the system control means is controlling the writing of said block record data and the said table-of-contents information data into the storage means.

2. The optical disk system as defined in claim 1, wherein said block record data includes at least one small block record data, said table-of-contents information data including at least a start address data, an end address data of said block record data, linking address data of said small block record data.

3. The optical disk system as defined in claim 1, wherein said command includes an indication of change in a block record data number.

4. The optical disk system as defined in claim 2, wherein said command includes an indication of change in a block record data number.

5. The optical disk system as defined in claim 1,
wherein said input means includes a compact disk player, and said command includes a user bit which is inputted from said compact disk player to said system control means and which indicates a change of a block record data number.

6. The optical disk system as defined in claim 2,
wherein said input means includes a compact disk player, and said command includes a user bit which is inputted from said compact disk player to said system control means and which indicates a change of a block record data number.

7. The optical disk system as a defined in claim 1,
wherein said input means includes a tape player/recorder, and said command is inputted from said tape player/recorder to said system control means, said command indicates a change of a block record data number.

8. The optical disk system as defined in claim 2,
wherein said input means includes a tape player/recorder, and said command is inputted from said tape player/recorder to said system control means, said command indicates a change of a block record data number.

9. The optical disk system as defined in claim 1, further comprising;
level detecting means which detects a decrease in the level of said block record data inputted from said input means and outputs a signal indicating a change of a block record data number, such that said command represents an instruction which reflects said outputs from said level detecting means.

10. The optical disk system as defined in claim 2, further comprising;
level detecting means which detects a decrease in the level of said block record data inputted from said input means and outputs a signal indicating a change of a block record data number, such that said command represents an instruction which reflects said outputs from said level detecting means.

11. An optical disk system comprising:
disk means having a user recording area and a user table-of-contents area;
input means for inputting at least one of a block record data, a table-of-contents information data, a command;
recording-reproducing means for recording-reproducing said block record data and said table-of-contents information data received from said input means;
storage means for storing said block record data and said table-of-contents information data; and
system control means for controlling the writing-reading of said table-of-contents information data into and out of the storage means, and the recording-reproducing of said data onto and from said disk means,
said recording including the recording of a temporary table-of-contents information data onto the user table-of-contents area of the disk means before said recording-reproducing means records the block record data onto the recording area of the disk means or the system control means receives the command produced by the input means.

12. The optical disk system as defined in claim 11, further comprising:
said recording including a recording define table-of-contents information data in place of said temporary table-of-contents information data onto the user table-of-contents area of the disk means after said recording-reproducing means finishes recording the block record data onto the user recording area of the disk means or after the system control means receives the command produced by the input means.

13. The optical disk system as defined in claim 11,
wherein said temporary table-of-contents information data includes at least one of start address data, end address data, and the linking address data of a plurality of unrecorded blocks in said user recording area of the disk means.

14. The optical disk system, as defined in claim 12,
wherein said temporary table-of-contents information data includes at least one of start address data, end address data, and the linking address data of a plurality of unrecorded blocks in said user recording area of the disk means.

15. The optical disk system as defined in claim 13,
wherein recording-reproducing means prevents from recording the block record data onto one of said plurality of unrecorded blocks if said one unrecorded block is smaller in length than a predetermined length.

16. The optical disk system as defined in claim 14,
wherein recording-reproducing means prevents from recording the block record data onto one of said plurality of unrecorded blocks if said one unrecorded block is smaller in length than a predetermined length.

17. The optical disk system as defined in claim 11,
wherein said temporary table-of-contents information data includes at least start address data and the end address data of an unrecorded block in said user recording area of the disk means.

18. The optical disk system as defined in claim 12,
wherein said temporary table-of-contents information data includes at least start address data and the end address data of an unrecorded block in said user recording area of the disk means.

19. The optical disk system as defined in claim 13,
wherein said disk means has an outer side and an inner side,
wherein said outer side contain tracks that are located at a radius that is greater than said inner side tracks,
said plurality of unrecorded blocks are linked in order from inner side to outer side of said disk means.

20. The optical disk system as defined in claim 14,
wherein said disk means has an outer side and an inner side,
wherein said outer side contain tracks that are located at a radius that is greater than said inner side tracks,
said plurality of unrecorded blocks are linked in order from inner side to outer side of said disk means.

* * * * *